US007333984B2

(12) United States Patent
Oosta

(10) Patent No.: US 7,333,984 B2
(45) Date of Patent: *Feb. 19, 2008

(54) METHODS FOR DOCUMENT INDEXING AND ANALYSIS

(76) Inventor: Gary Martin Oosta, 5377 Ashwood Ln., Gurnee, IL (US) 60031

( * ) Notice: Subject to any disclaimer, the term of this patent is extended or adjusted under 35 U.S.C. 154(b) by 0 days.

This patent is subject to a terminal disclaimer.

(21) Appl. No.: 11/083,328

(22) Filed: Mar. 18, 2005

(65) Prior Publication Data

US 2005/0165736 A1 Jul. 28, 2005

Related U.S. Application Data

(63) Continuation-in-part of application No. 09/922,700, filed on Aug. 7, 2001, now Pat. No. 7,130,848.

(60) Provisional application No. 60/224,069, filed on Aug. 9, 2000, provisional application No. 60/258,136, filed on Dec. 22, 2000.

(51) Int. Cl.
*G06F 17/30* (2006.01)

(52) U.S. Cl. .................. 707/5; 707/3; 707/4; 707/6; 707/10; 707/102

(58) Field of Classification Search ............ 707/3–6, 707/10, 102; 715/530, 500, 757
See application file for complete search history.

(56) References Cited

U.S. PATENT DOCUMENTS

| 5,887,120 | A | * | 3/1999 | Wical | 706/46 |
| 5,953,718 | A | * | 9/1999 | Wical | 707/5 |
| 5,991,751 | A | * | 11/1999 | Rivette et al. | 707/1 |
| 6,360,227 | B1 | * | 3/2002 | Aggarwal et al. | 707/102 |
| 6,405,188 | B1 | * | 6/2002 | Schwartz et al. | 707/3 |
| 6,629,097 | B1 | * | 9/2003 | Keith | 707/5 |
| 6,704,698 | B1 | * | 3/2004 | Paulsen et al. | 704/1 |

* cited by examiner

*Primary Examiner*—Cam Y Truong
(74) *Attorney, Agent, or Firm*—Myers Bradford, PLLC; Keith Scala

(57) ABSTRACT

The present invention describes a method that is based on an analysis of document information, and which can be used for conducting and potentially accelerating business opportunity assessments and technology investment decisions. Documents include patent documents, scientific and trade literature, magazines, e-zines, Internet search results and the like. The system can be implemented as an automatic or semi-automatic analysis system, and it ultimately provides a document index or visual index from which technology, investment or business decisions can be drawn. The method comprises the steps of selecting a document data set for analysis, selecting one or more analysis means, such as means to determine relationships among the documents in the selected set, and then, forming a representation of the result for further analysis, display or planning.

4 Claims, 10 Drawing Sheets

Abstract Word Correlation Matrix

|         | laundry | detergent | odor* | granul* | agricultur* | pesticid* | herbic* | insect* |
|---------|---------|-----------|-------|---------|-------------|-----------|---------|---------|
| laundry | 0 | 69 | 7 | 63 | 0 | 0 | 0 | 0 |
| detergent | 69 | 0 | 11 | 83 | 1 | 0 | 0 | 0 |
| odor* | 7 | 11 | 0 | 2 | 0 | 0 | 4 | 3 |
| granul* | 63 | 83 | 2 | 0 | 8 | 3 | 11 | 1 |
| agricultur* | 0 | 1 | 0 | 8 | 0 | 0 | 8 | 0 |
| pesticid* | 0 | 0 | 0 | 3 | 0 | 0 | 0 | 1 |
| herbic* | 0 | 0 | 4 | 11 | 8 | 0 | 0 | 2 |
| insect* | 0 | 0 | 3 | 1 | 0 | 1 | 2 | 0 |

Fig. 3a
Expert opinion

Laundry Technology Topic

Agriculture Technology Topic

Fig. 3b
Word correlation analysis result

Second Technology Topics

Laundry Technology Topic:
- acid
- all
- bleach
- compositions
- containing
- detergent
- dry
- free
- granular
- laundry
- product
- silicate
- surfactant
- water
- carbonate
- compositions
- detergent
- dry
- fabric
- granular
- laundry
- process
- water Agriculture Technology Topic:
- agents
- growth
- herbicidal
- liquid
- particles
- plant
- water
- amine
- formulation
- formulations
- glyphosate
- granules
- growth
- herbicidal
- oxide
- plant
- powder
- powders
- regulant
- salts
- water

Patenting Statistics: An Indicator of Technology Status

7a

| Pattern | Biotechnology | Laundry Detergent | Cosmetics/Perfume | Wells, Drilling |
|---|---|---|---|---|
| Abstract | 13 | 0 | 6 | 1 |
| Book | 74 | 10 | 10 | 8 |
| Brochure | 7 | 17 | 12 | 2 |
| Government | 2 | 0 | 1 | 0 |
| Journal | 650 | 9 | 80 | 23 |
| Newspaper | 60 | 0 | 0 | 0 |
| Other | 4 | 17 | 0 | 0 |
| Patent | 1 | 9 | 1 | 3 |
| TOTAL | 811 | 62 | 110 | 37 |
| Number of Patents | 13 | 10 | 11 | 11 |
| Journal Refs/Patent | 62.4 | 6.2 | 10 | 3.4 |

7b

| Categorization & Identification Accuracy | | |
|---|---|---|
| Run 2 | Category | Ref. |
| OK | 99.12% | 98.25% |

*Fig. 7*

METHODS FOR DOCUMENT INDEXING AND ANALYSIS

This application is a continuation of parent application Ser. No. 09/922,700, filed on Aug. 7, 2001, now U.S. Pat. No. 7,130,848.

This application is related to and claims priority from Provisional Patent Application No. 60/224,069, filed Aug. 9, 2000 and from Provisional Patent Application No. 60/258,136, filed Dec. 22, 2000.

FIELD OF THE INVENTION

The invention relates generally to the field of data analysis, and in particular to improved methods of automated or semi-automated analysis of patents, scientific papers or other text-based literature to facilitate technology investment or business decisions. The method is also generally related to methods of indexing documents, particularly patent documents, to assist in analyses which are particularly useful in legal, business and technology development decisions, and provides novel, cost-effective and rapid methods for creating an index of documents that can be easily interpreted or further analyzed.

BACKGROUND OF THE INVENTION

Information, particularly technical information, is becoming ever more available. For example, full text U.S. patents are available on the World Wide Web and patent text data or images are available commercially. Some scientific journals that had been available only in technical libraries are now available on the World Wide Web. Trade journals, formerly sent in printed form only to area specialists, but are now available on the World Wide Web. Trade organizations have websites that are information rich. Search engines make retrieving raw information from the World Wide Web fast and easy. Many newspapers and magazines that were previously delivered only in print format, are now available in electronic formats. Further, commercial sources of similar data are also available. For example, marketing, technical and legal information can be purchased in paper and electronic form from organizations such as Derwent, or Lexus-Nexus among others. The problem librarians, researchers, and managers now face is organizing information in such a way that it can be easily assimilated, interpreted, and acted upon particularly for business decisions where speed and accuracy are critical.

Document Information Sources and Uses

Patents are becoming ever more central to the success of technology related businesses. Patenting activity in almost all areas of technology has exploded in recent years. Some have suggested that 90-95% of all the world's inventions can be found in patent documents [1]. Patents are considered to be a key in translating inventions to commercial use. [2]. Innovation is considered to be the driving force behind competition, economic growth and the creation of jobs [3]. Patents play a central role in recording innovation and in business strategy development. FIG. 1 illustrates the unique position of patents in the information flow pathway from basic science through patents to market launch [4]. The existence of a strong linkage between patenting activity and basic science has been postulated [5].

Because patents record innovation and are keys to protecting products, they contain a wide variety of information that is useful in making business investment and technology development decisions. The description of methods, procedures, synthetic routes, compounds, devices, and other information that is included in a patent provides a picture of the invention itself. A patent typically also provides the author's vision of the context in which the invention is meaningful. Hence, a patent typically contains information on other "similar" inventions and the status of the basic science that supports the invention. A patent can also contain a description of the market conditions that make the patent useful. Because a patent is highly structured, relevant information is located in predictable locations within the patent, a fact that can facilitate analysis with automated or semi-automated methods.

Scientific journal articles chronicle the development of an idea, theory, concept or product. Kuhn describes one theory of scientific development in his book, *The Structure of Scientific Revolutions* [6]. Because scientific journal articles are typically peer reviewed, some consider a journal articles to be accurate representations of the current understanding of the laws of science. Scientific journal articles are typically highly structured documents. Titles convey the topic discussed in the article, often in significant detail. An abstract provides a summary of the scientific methods used and of the experimental results. Often, an abstract contains a one or two sentence conclusion that describes the implications of the results. In most journals, the experimental and data analysis methods are described in sufficient detail for one skilled in the art to reproduce the experimental protocol. The results are summarized and the conclusions state the implications of the results. Finally, a journal article contains references to previous work by others, a rich source that describes the author's vision of the area's historically important documents. Because the scientific journal article is highly structured, relevant information is located in approximately predictable locations, facilitating analysis with automated or semi-automated methods.

Trade journals articles are typically organized similarly to scientific journal articles. Trade journals chronicle the commercialization of ideas, methods and products, and can contain a more detailed picture of the commercial or market situation than might be expected in a scientific publication. Titles of a trade journal article convey the main topic discussed in the article. Abstracts provide summary information, and the body of the article provides details about methods and instruments used. The body of the article typically provides details and the results. The article often provides a summary of the results that is similar to an abstract. Often trade journals cite some relevant literature to provide the reader a window on the literature that author considers to be relevant. The structure of trade journal article is typically similar to a scientific journal article, and in trade journals, relevant information is located in approximately predictable locations, facilitating analysis with automated or semi-automated methods.

Newspapers, magazine articles, newsletters, advertisements and other popular publications can provide a picture of the popular perception of an area of business or technology. Newspaper and magazines articles and other publications are usually structured. Usually the articles have a title or a headline that describes the content of the article, and a body of the article that describes the area. Typically, newspapers and magazine articles do not provide summary abstracts or references. Because newspapers, magazine articles, newsletters, advertisements and other popular publications are structured, relevant information is located in approximately predictable locations, facilitating analysis with automated or semi-automated methods. An automated or semi-automated analytical method that could help link popular perception about an area with technical or patent information would be valuable assessment tool.

Marketing research information or reports document public perception or participation in a market area. Certain technical documents, especially patents and trade journals, can be expected to use the same or similar vocabulary that is found in market research reports. An automated or semi-automated analytical method that could link market research and technical information would be a valuable business asset.

Web sites posted on the World Wide Web by various organizations can be a useful source of information. The structure of websites and the quantity and accuracy of information contained in them is highly variable. Yet, a basic structure that permits analysis still exists. Most websites have a title that contains some information describing the site contents. Some sites provide summaries or indexes to their sites. Methods that could identify common vocabulary and help link web sites with common information would be beneficial tools for business and technology investment decisions.

A Web search engine can also provide information that can be analyzed to better understand the focuses of an area that has been searched. For example a search returned by Alta Vista or Google, among other search engines, is organized into titles and phrases that can be analyzed to show relationships among various sites. The vocabulary retrieved by the web search engine can help link abstracts or hits with common content, allowing rapid indexing and organization of data retrieved from a common web search.

Document Analysis Methods.

The document sources cited contain substantial information on technology, competitors, and market status indications. Collections of documents can be studied to provide a picture of business, technology or market area development. A variety of methods have been employed to attempt to extract business, technology or market information from document collections including expert analysis, patent or document counting statistics, patent class analysis, bibliographic methods such as co-occurrence analysis, including co-word or co-citation analysis, technology roadmapping, and methods from artificial intelligence such as genetic algorithms, Bayesian learning methods, Markov models and the like. The historical development and technical aspects of bibliographic methods have been summarized [7,8,9,10].

Co-word analysis is a bibliographic method that allows an exploration of the vocabulary used in a document set in order to identify major themes within the document collection. In co-word analysis the frequency of appearance of selected keywords or phrases is measured. A major premise of co-word analysis is that the co-word pairs that are used frequently indicate major topics that run throughout a set of documents.

Co-word analysis can be implemented with a simple database [11,12], and linkage maps can reveal overall structure of a research area [13]. However, published maps do not appear to reveal the details of the area that are needed for business opportunity assessments.

Co-citation analysis is a bibliographic method that measures the frequency with which two references appear together in the references of a scientific journal article. Co-citation analysis has been successfully applied to studying the structure of science through references in scientific journal articles [14]. Co-citation analysis with U.S. patent references has been used to assist in corporate licensing decisions [15], but has not been successfully applied to scientific references in patents because the formats of the references are highly heterogeneous [14].

Artificial intelligence, methods from data mining and knowledge discovery can also be used to reveal relationships among words. Artificial intelligence, data mining and knowledge discovery employ methods such as genetic algorithms, Bayesian learning, neural networks, Markov models, hidden Markov models, partial least squares, and principal component analysis, among others.

Many artificial intelligence methods have elements in common. Most methods start by building mathematical models that describe the document collection including document vocabulary and sometimes document structure. The data from which a model is constructed is often called a training set, and often must include examples of all the situations that the model is expected to be able to find or detect. After the mathematical model has been constructed, the model can be used to identify new structures, phrases, images and the like that are similar the structures, phrases, images used in developing the mathematical model. Careful choice of the training set is required. Otherwise, the model can respond with unwelcome surprises or provide answers that are actually incorrect.

Document Analysis Method Examples.

In U.S. Pat. No. 5,991,751, Aurigin discloses a system of multiple databases that correlates patent information with bill of materials information, personnel information, R&D spending information among many other information types. Citation analysis is the primary bibliometric method disclosed.

Aurigin in collaboration with Sandia Laboratories and the Institute for Scientific Information have produced topographical maps of technology for a given point in time. While these maps provide a good visual representation of linkages among scientific and technological endeavors, they do not provide the resolution or time perspective needed for most business decisions.

Co-word analysis of documents has been used by the Sec. of the Navy (U.S. Pat. No. 5,440,481) describes a process by which repeated themes can be identified if the words composing the themes are adjacent to one another.

Xerox (U.S. Pat. No. 6,038,574) describes a co-citation analysis method in which hyperlinks in web pages are viewed as references, and the relationships found have been used to help create a web page index. None of the methods provides adequate detail for the analysis of business or technical information.

Artificial intelligence methods have been used to identify images or military targets. Artificial intelligence methods, particularly Markov models, have been used in voice recognition, handwriting recognition and identification of genetic sequences. The application of Markov models to the analysis of sequences, including word sequences and gene sequences, is well known in the art. Several patents that describe voice recognition and text to speech methods apparently employ Markov models. U.S. Pat. Nos. 6,003,005 and 5,230,037 provide examples of speech recognition applications of Markov models. With appropriate training, a reasonable, but not perfect, voice to text conversion can be achieved with popular software such as Dragon Naturally Speaking™, and others. The National Technical Information Service offers software (order number AD-M000 099) that claims to be able to separate multiple simultaneous conversations after appropriate training of a Markov Model.

Artificial intelligence methods can be used to study words and vocabulary contained in documents. With artificial intelligence methods, words or groups of words can be treated as vectors in multidimensional space. Mathematical manipulation of the vector space can reveal relationships among the words or groups of words in a document or a set of document. In common with most artificial intelligence methods, a mathematical model must be constructed from example data, a training set. A key limitation of artificial intelligence methods is the need to provide an all-encompassing training set, a requirement that can substantially limit the ability of the methods to discover new and unexpected relationships within the data.

BRIEF DESCRIPTION OF THE DRAWINGS

FIG. 3a depicts a preferred embodiment of the current invention, wherein a word correlation matrix is generated from a study of patents involving laundry detergents and agricultural applications of surfactants. Words used for the correlation are derived from expert opinion about the structure of the market.

FIG. 3b depicts a further preferred embodiment of the current invention and shows technology topics formed by analyzing patent abstracts using words from patent titles.

FIG. 4 also represents additional information that can be available with a point and click method, but which may not be initially shown on the visual index.

FIG. 7a shows an example result of the analysis method of the current invention, and illustrates the method of Step 240, FIG. 6. The table shows the results of classifications of 1020 references from the Other References section of 45 U.S. patents. FIG. 7b indicates the level of success in classifying patent references in to the predetermined categories, and the level of success in of correctly identifying the journal names in the sample set.

SUMMARY OF THE INVENTION

Figure 1:
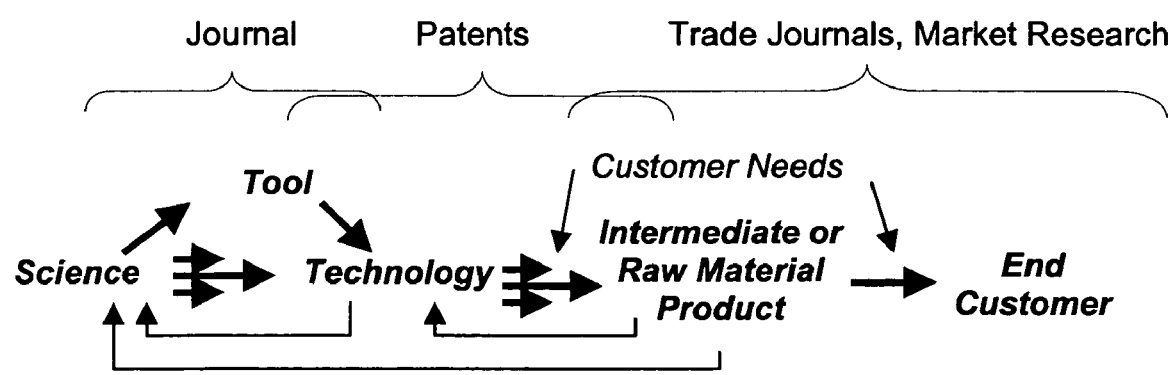
FIG. 1 is a diagram of the flow of information from basic science through patents to trade journals, and finally, to market launch. The arrows indicate the direction of knowledge flow. The information sources common to each knowledge category are also indicated. This figure is based on reference 4.

In accordance with the present invention, it has been discovered that by utilizing appropriate tools, not previously available, the information in a collection of documents including patents, trade and scientific literature, marketing research literature, newspaper articles, magazine articles, web sites and the like can be efficiently summarized and analyzed in a semi-automated or automated way. The tools thus provided by the present invention can be advantageously used, for example, to provide clear insights into the development status of technology. A clear understanding of technology development status can lead to faster, more secure, and more confident business or investment decisions.

Accordingly, it is an object of the invention to provide a means of supplying a visual index to a selected set of documents that describe an area of popular interest, an area of business interest or a technology area. A result of the method is to provide a means to identify and display, if desired, patterns in patenting activity, patterns in scientific research, patterns in commercial activity or patterns in popular interest in an area that can affect business or technology decisions.

It is a further and particular object of the invention to provide methods by which co-citation analysis can be conducted using the Other References Section of an issued U.S. Patent, including scientific references. It is a still further object of the invention to provide methods by which methods such as genetic algorithms, Bayesian learning, neural networks, Markov models, hidden Markov models, partial least squares, and principal component analysis and the like can be conducted using the Other References section of issued U.S. patents. It is another object of the invention to provide methods by which references that are not in as standard format can be formatted into a standard format, enabling effective analysis. It is an additional object of the invention to enable the use of co-citation analysis genetic algorithms, Bayesian learning, neural networks, Markov models, hidden Markov models, partial least squares, and principal component analysis and the like to create a visual index to a selected set of patents.

It is a still further object of the invention to provide cost-effective means for classifying a document set into groups for use in a visual index by using word correlation methods to identify common or related vocabulary within the document set. Documents sets can include the entire document or sections thereof, of patents, scientific journal articles, trade journal articles, newspaper or magazine articles, web sites or the search results from Internet searches, in order to classify a document set into groups for use in a visual index. Document sets can also include combinations of data from various sources.

It is a still further object of the invention to provide an expert system in which scientific or market knowledge can be combined with document analysis algorithms, including co-word analysis, co-citation analysis, genetic algorithms, Bayesian learning, neural networks, Markov models, hidden Markov models, partial least squares, or principal component analysis, to provide cost-effective means for classifying a document set into groups for use in a visual index.

It is another still further object of the invention to provide cost-effective means to identify trends on the World Wide Web, and to provide a visual index to selected sets of web sites.

It is another still further object of the invention to provide cost-effective means to identify trends in marketing research reports or market related documents, and to provide a visual index to the selected document set.

Therefore, it can be appreciated that the present invention provides novel methods by which document analyses can be performed, a visual index to the set of documents can be created, enabling more rapid and accurate technology based business and investment decisions, and therefore, also provides methods for tracking the patterns of emergence of technology, scientific or other business information.

DETAILED DESCRIPTION OF THE INVENTION

Definitions

The following terms have the meaning described below, and are used throughout this specification.

Analysis Method: A method by which words or references from a document set are grouped or clustered. In this application, analysis methods typically include co-occurrence analysis methods such as co-word or co-citation analysis, and methods from artificial intelligence, data mining and knowledge discovery such as genetic algorithms, Bayesian learning, neural networks, Markov models, hidden Markov models, partial least squares, and principal component analysis, among others.

Artificial Reference: The basis for co-citation analysis typically is the identification of two journal references that are cited together in one or more papers. While the method is most often applied to studies based on references contained in scientific journal articles, the technique is more general. A necessary element for co-citation analysis is that references exist in a standard format. Where the initial data does not provide such uniformity, it is necessary to form the uniformity by manipulating the references to generate an artificial reference that is sufficiently uniform to permit the analysis to occur.

Artificial Intelligence Methods: Artificial intelligence methods include methods such as genetic algorithms, Bayesian learning, neural networks, Markov models, hidden Markov models, partial least squares, and principal component analysis. These methods are characterized by the needed for a set of examples, a training set, which can be used to construct a model. They are further characterized by the ability of the model to predict situations that were trained into the model.

Automatic or Semi-automatic system: Automatic indicates a system that runs without substantial user intervention. Semi-automatic indicates a system that runs with some user intervention. With a semi-automatic system, a user can, for example, choose the specific analysis methods or steps that best suited to the needs of the analysis.

Bibliometric Method: An analytical method that is based on citations, references, words, or word groups that are found in documents, including newspapers, trade journals, magazines, and especially preferred are scientific journals or patent documents. Bibliometric methods include publication counts, patent counts, citation analysis, and co-occurrence analysis including co-word and co-citation analysis.

Display: A display is any means by which patterns in a visual index of the current invention can be discerned. The display can be a computer screen, a print-out, poster, a projection, a data set, a table, or other optical, physical or electronic representations of the data, or other suitable methods that allow patterns to be perceived or recognized. The display can also be a starting point for further analysis, either manual or automated.

Document Set: A collection of text based documents for analysis. Documents can include patents, scientific and trade journal articles, market reports, newspapers, magazines, e-zines, Internet site pages, an Internet search returned from a search engine, and similar publications. Publications can be from traditional print documents or they can be published on the Internet or stored in a database in electronic form or the like. Further, a document set can be drawn from data that is proprietary to an organization. For example a document set can be drawn from the internal business documents of a company.

Visual Index: A method of displaying the emergence of technology based on an analysis of information contained within a document set. The visual index provides a means by which a larger data set can be condensed or summarized to provide easy assimilation or use in other analysis. If desired, the visual index provides a display that can be linked to more detailed information that can be displayed as needed. The visual index also displays patterns of technology emergence that can facilitate business or investment decisions or further analysis by manual or automated methods.

Co-Word Methods and Patent Analysis

In accordance with the present invention, analysis of a collection of patents can be conducted using patent counting, citation analysis, co-occurrence analysis, especially co-word analysis or co-citation analysis, or a combination of the above analytical methods, and can provide a highly accurate technology opportunity assessment and the market context of the opportunity. An analysis of a collection of scientific journal articles in accordance with the invention can provide insight into the development of basic science, and an analysis of a collection of websites in accordance therewith can reveal trends in current thinking on any subject. The method of the invention can be implemented as an automatic or semi-automatic analysis system, and provides a visual index from which critical business information decisions can be drawn.

Figure 2:
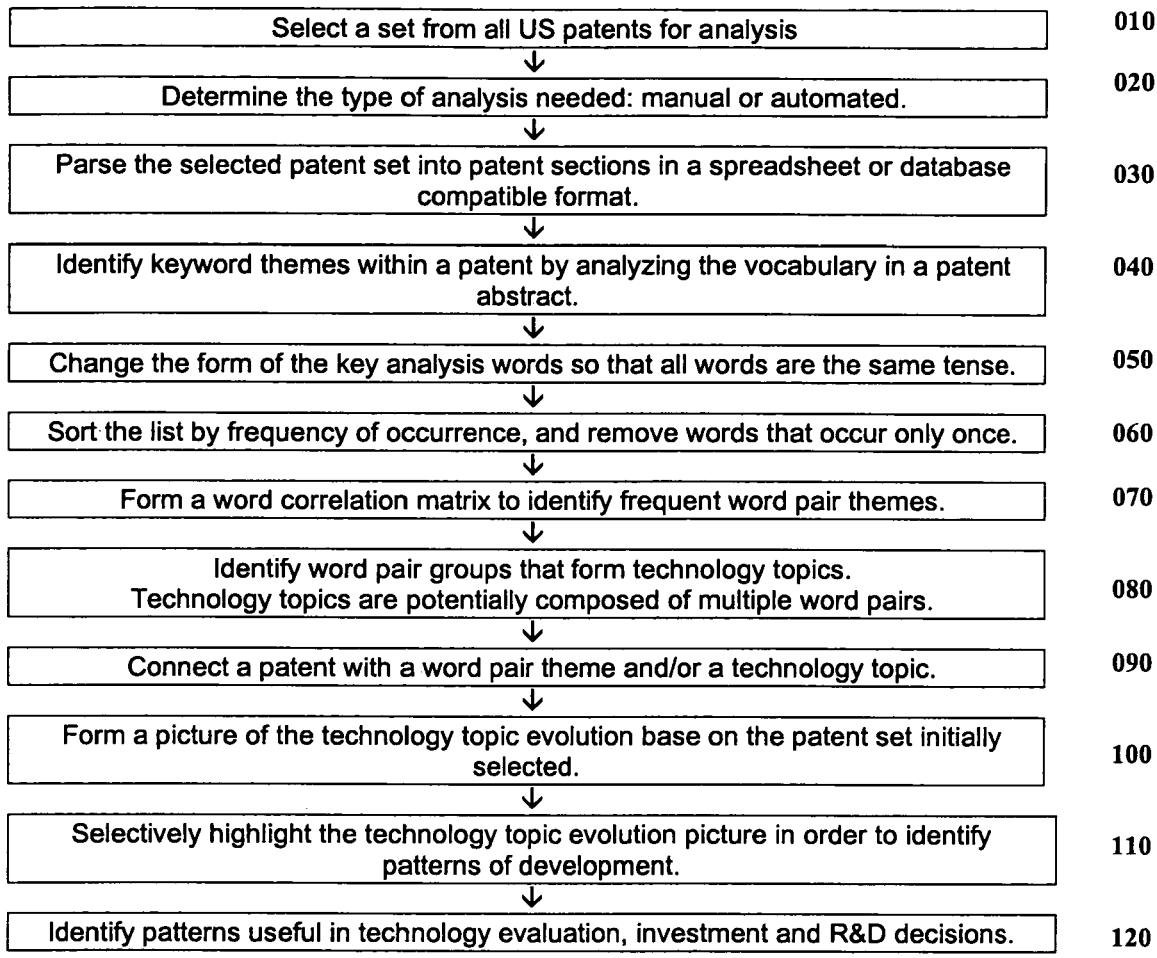
FIG. 2 is a block diagram depicting the method of the current invention, to create a visual index using co-word based vocabulary analysis to create patent groupings.

Referring now to FIG. 2, a method is diagrammed that leads to a visual index that is based on co-word analysis. Preferred embodiments of the method of the invention are now described with reference to FIG. 2. For the sake of clarity, the method will be described using an example analysis that involved analysis of titles and abstracts of U.S. patent documents describing technology futures in surfactants used in laundry detergents or agriculture. The examples herein are not to be considered to be limiting of the invention, but generally illustrate the practice of the invention.

Step 010 involves selecting a set of U.S. patents for analysis. The set can be selected by searching with keywords, by searching patent classes, by searching assignees or authors, or by a combination of methods. Several searches with different strategies can be combined to create the patent document set. The result of the search is a comprehensive set of patents that substantially encompasses the area. The set can include front-page information, or it can include the entire electronic text version of a patent if a more comprehensive analysis is desired. Sources of patents for use in this step include the U.S. Patent and Trademark World Wide Web site, commercial sources, CD ROM compilations, and other means to obtain access to patents.

Step 020 is an especially preferred step in the method of the invention. If the comprehensive set of patents for analysis is less than approximately 20 patents, automated or semi-automated analysis may not be necessary. Reading and manually classifying the results may appropriate, but automated or semi-automated analysis can be performed. If the comprehensive set of patents for analysis is greater than approximately 20, more preferably greater than approximately 50 patents, automated or semi-automated analysis is appropriate. With many patents to analyze, the possibility of missing a connection or missing an important theme becomes larger, and automation of the analysis can help to avoid such errors.

Step 030 is a step added in another preferred embodiment of the invention, and readies the data for an electronic analysis system. The selected set of individual patent documents is divided into patent sections, and each section is incorporated into an area of a spreadsheet. The result is that the patent sections reside in a spreadsheet or database compatible format.

Patent data can be purchased from the U.S. Patent and Trademarks Office, the European Patent Office, and various commercial entities. The purchased data can be pre-formatted and stored on in a database. Data selected from such a pre-formatted database can accomplish the purpose of Steps 010-030.

From patent front pages, the following patent sections can be selected: title, abstract, filing date, issue date, assignee, authors, filing classes, U.S. references, including classes, foreign references, other references, and filing attorneys. From the complete electronic text version of the patent the following patent sections can be selected: the same front page data categories mentioned above, the background of the invention, including a description of prior art, the detailed description of the invention, and the claims.

Compiling the information in a spreadsheet or database compatible format is a key step in the automation of patent analysis. It is possible that Step 030 could be an optional step in some programming languages. However, when patent data from the World Wide Web Site of the U.S. Patent and Trademark Office is opened in Microsoft Excel™, for example, the patent title and patent number appear always to be in the same location, and can easily be identified. However, other tables shift from document to document depending on the structure of the document. Step 030 is a preferred embodiment to gain control over the data, and assure that appropriate elements are correctly categorized for analysis.

In Step 040, a list of analysis key word is created. Key words can be chosen from any patent document section or from the entire document. The types of questions that the analysis must answer will determine which sections of the patent document set are used. For the sake of clarity, an example will be described using the assumption that keywords will be derived from the set of all patent abstracts. This assumption is not intended to imply a limitation.

Initially, a list of all the words from all abstracts in the selected patent set is fromed. Duplicate and non-essential words can be removed without harming the analysis. For example, the following types of words can be removed without jeopardizing the analysis: articles, conjunctions, helping verbs and certain legal words. A list of Key Analysis Words is thereby created. This step is an especially preferred embodiment of the invention as removal of extraneous words greatly simplifies the analysis by reducing the computing load and by eliminating unimportant correlations (Step 070).

Step 050 is an especially preferred embodiment of the invention as it can help to improve the accuracy of correlations determined in Step 070. In this step, the form of the Key Analysis Words is changed so that all words are the same tense or word form. This step removes analysis redundancy and helps to correctly identify word themes. For example, preparing, prepares or prepared would be converted to prepare or alternatively prepar* where * represents any number or combination of letters, numbers or symbols. Prepar* then defines a group of words that are initially treated as one word in Step 070.

Step 060 is an especially preferred embodiment of the invention as it helps to improve the analysis efficiency by removing words for which multiple correlations are not possible. The list of key analysis words is sorted by frequency of occurrence, and words that occur only once are removed. This step results in the formation of a Cleaned-up Keyword Set for use in a correlation matrix.

A further simplification can be achieved by removing from the analysis words that appear infrequently. For example, if a word appears only once in the key analysis words list, it cannot be a part of a frequently occurring word pair. If a word pair appear only three times, for example, it may still not be part of an important word pair, if most other words appear substantially more frequently. A threshold can be set below which words can be eliminated from the analysis. The probability of not finding an important word pair by dropping low frequency words increases as the word frequency increases. From a risk assessment, a threshold word frequency that is appropriate for the study can be chosen.

In Step 070, a First Word Correlation Matrix is formed. In a preferred embodiment, a word correlation matrix such as shown in FIG. 3 is formed from the Cleaned-up Keyword Set. To form the matrix, the words of a Cleaned-up Keyword Set are arrayed along the top and left side of a two dimensional matrix. The matrix can optionally be displayed on a spreadsheet such as Excel or Lotus123 or held in computer memory. Each cell in the matrix corresponds to a word pair. The number of times that a word pair appears in a set of documents or document sections, for example all patent abstracts, is counted, and the total number of occurrences of the word pair is recorded in the appropriate cell of the First Word Correlation Matrix. The result of Step 070 is a First Word Correlation Matrix in which each cell of the matrix contains a number that represent the frequency with which that word pair is found together in the all of the abstracts of the patent data set.

In an especially preferred embodiment, substantial saving of time and computer resources can be achieved by sorting the Cleaned-up Keyword Set before forming the First Word Correlation Matrix so that the most frequently appearing words are in the upper and left portions of the correlation matrix. Because the method seeks to identify major patent themes that are derived from frequent word pairs, the probability that a significant word pair will exist decreases from the upper left corner of the matrix to the lower right portion of the matrix or any movement from left to right. By setting a risk tolerance factor, some portions of the correlation matrix need not be computed. Other sorting formats can result in similar time and resources savings.

Step 080 is an added step in another preferred embodiment of the present invention that results in the formation of First Technology Topics. A First Technology Topic is composed of one or more related words or word phrases. The process can be run automatically or semi-automatically.

As an example of one embodiment of the invention, a First Technology Topic is formed by choosing groups of words that represent an area. In FIG. 3A, for example, the Laundry Technology Topic is represented by the following words: laundry, detergent, granulation, and odor. In this embodiment, word groups that form a First Technology Topic can be chosen based on personal knowledge or experience, by expert analysis of scientific or trade literature, from marketing research or marketing reports, or from newspaper articles, magazine articles or similar literature. If desired, several Technology Topics can be formed by this method. An advantage of this embodiment is that the selection of the word groups for a Technology Topic does not require substantial computing resources and can be completed quickly. In this embodiment Steps 040-070 are optional, further saving computation resources and time. A disadvantage is that expert opinion can introduce personal bias that could shift or alter the result of the method.

In a preferred embodiment, First Technology Topics can be formed by associating high frequency word pairs from the First Word Correlation Matrix. The association can be accomplished by identifying the most frequently cited word pairs, and by identifying other word pairs that correlate with one or more words in the original word pair. This step results in clusters of words, and ultimately defines one or more sets of highly associated words, First Technology Topics, that describe activities within the patent abstracts of the document set.

In a First Word Correlation Matrix, the first column shows all the potential word pairs that might be formed from word heading the first column. In FIG. 3, laundry is the first word and the potential word pairs include laundry:laundry, laundry: detergent . . . laundry:insect*. In one embodiment of the present invention, a Technology Topic could be composed of all of the words in one column with a non-zero count. In FIG. 3 and in the case of the word laundry, a Technology Topic is composed of the following words: laundry, detergent, granulation and odor. Similarly, the Technology Topic for detergent, the word heading column 2 in FIG. 3., is composed of the following words: detergent, odor, granulation and agriculture. The process can be continued across the matrix.

In a preferred embodiment of the present invention, Streamlined First Technology Topics can be formed by not including less frequent word pairs. To eliminate infrequent words from the First Technology Topic, a threshold can be set to accept word pairs into a First Technology Topic only if the count for that word pair is above the threshold. For example, if the threshold were set to 2, the First Technology Topic for the column headed by the word herbicid* in FIG. 3 would be composed of only the following words: herbicid*, odor*, granulat* and agricult*, and the word insect* would not be included. Use of a threshold to form First Technology Topics can improve the focus of the First Technology Topics by eliminating stray words.

A variety of methods can be employed to set the threshold needed to form the Streamlined First Technology Topics. In one embodiment, the threshold can be set as a number that is chosen by the analyst. In a preferred embodiment, the threshold can be set by choosing a set fraction of the most frequent word pair in the First Word Correlation Matrix. In another preferred embodiment, the threshold can be set, by choosing a set fraction of the most frequent word pair in the selected column of the First Word Correlation Matrix. Other methods for choosing the threshold are also possible.

A result of Step 080 is the formation of a series of First Technology Topics composed of one or more words that are strongly related to each other. The collection of First Technology Topics is a Second Word Matrix. Some words could be found in several First Technology Topics, and the common words define relationships between First Technology Topics. Optionally, the process described in Step 080 can be applied to the Second Word Matrix to further associate the related Technology Topics. The result is the formation of a set of Second Technology Topics that are condensed versions of the First Technology Topics. FIG. 3B illustrates the result of the process to form Second Technology Topics. Optionally, further correlations can conducted to form Third, Fourth or Fifth Technology Topics. The process for forming Second Technology Topics can be performed manually by inspection or it can be run semi-automatically or automatically.

Optionally, Technology Topic word groups from an initial patent document set can be used as search terms for a new more comprehensive or more focused search. This procedure could help to uncover patents not originally included in the data set, but which should have been included for optimum completeness.

In Step 090, patents from the initial document set are associated with the appropriate Technology Topics. A Technology Topic is a word group that is composed of highly associated words. Patents that contain the some or all of the words of a Technology Topic are assigned to that Technology Topic.

In one embodiment, assignment of a patent to a Technology Topic has been made based on the number of words from a Technology Topic that can be found in a patent abstract, for example. Alternatively, assignment of a patent to a Technology Topic can be been made based on the percent of words from a Technology Topic that can be found in a patent abstract, for example. A disadvantage of this embodiment is that frequently appearing words and words that appear in several Technology Topics can sometimes lead to inaccurate or uncertain assignments.

Frequently repeated words are the basis for the formation of Technology Topics, but surprisingly, it is the less frequent words in a Technology Topic word group that are most useful in accurately assigning a patent to a Technology Topic. By adding a weighting factor that emphasizes the least frequent words in a word group, improvements can be achieved in the accuracy of correctly assigning a patent to a Technology Topic. In a preferred embodiment of the present invention, an artificial scoring system is used to assign patent to Technology Topics. The number of patents that contain each word in the Technology Topic is summed. Then, the sum is multiplied by a weighting factor. A high frequency word within a Technology Topic is de-emphasized by multiplying the word count by 0.5. A medium frequency word is multiplied by 1.0, and a low frequency word is multiplied by 2.0. Other weighting factor systems will be apparent to those skilled in the art, and can be implemented within the spirit of this invention.

In Step 090, word groups previously indicated by a wildcard, such as prepar*, can now searched as individual words. The search for the appropriate vocabulary can include the entire patent or only selected sections. If selected sections are searched, and the word pair theme or Technology Topic is not mentioned in all sections, further analysis can be triggered to understand the significance of the result.

In Step 100, a standard picture of patent art evolution in a Technology Topic can be assembled by plotting the patents on an x-y grid with the filing date or issue date along the x-axis with Technology Topics and assignees separated along the y-axis. Single patents can be plotted together. One or more Technology Topics can be plotted together in the same figure.

Figure 4:
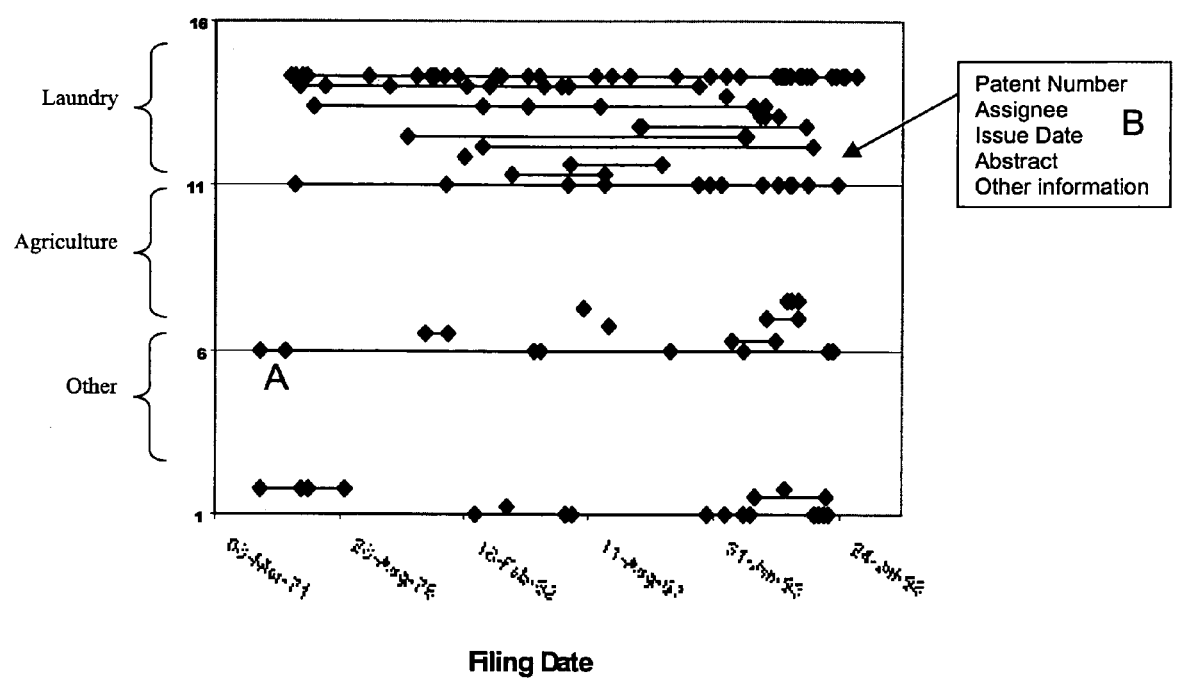
FIG. 4 depicts another preferred embodiment of the method of the current invention, and illustrates one form of a visual index. The example is of a visual index for U.S. patents associated with detergents and laundry or agricultural applications. Patents in the top section represent the patents that are clustered together because they use vocabulary that describes laundry applications of detergents. Patents in the middle section are clustered together because they use vocabulary that describes agricultural applications of detergents. Patents in the lower section are not relevant to the two categories plotted. Patents that are plotted along an axis for convenience labeled 1, 6, 11, 16, are patents assigned to individuals. Patents connected by a line belong to a single assignee.

FIG. 4 is an example of a technology evolution picture or visual patent index for a selected set of patents involving the use of surfactants in laundry and agriculture. Optionally, it is possible to further link each point to additional data or even the entire patent by applying point and click techniques. An example of such a method is also diagrammed in FIG. 4.

In some cases, otherwise distinct Technology Topics can share some vocabulary with another Technology Topic. In this case, a three or more dimensional representation can be used and included in yet another preferred embodiment of the invention.

Figure 5:
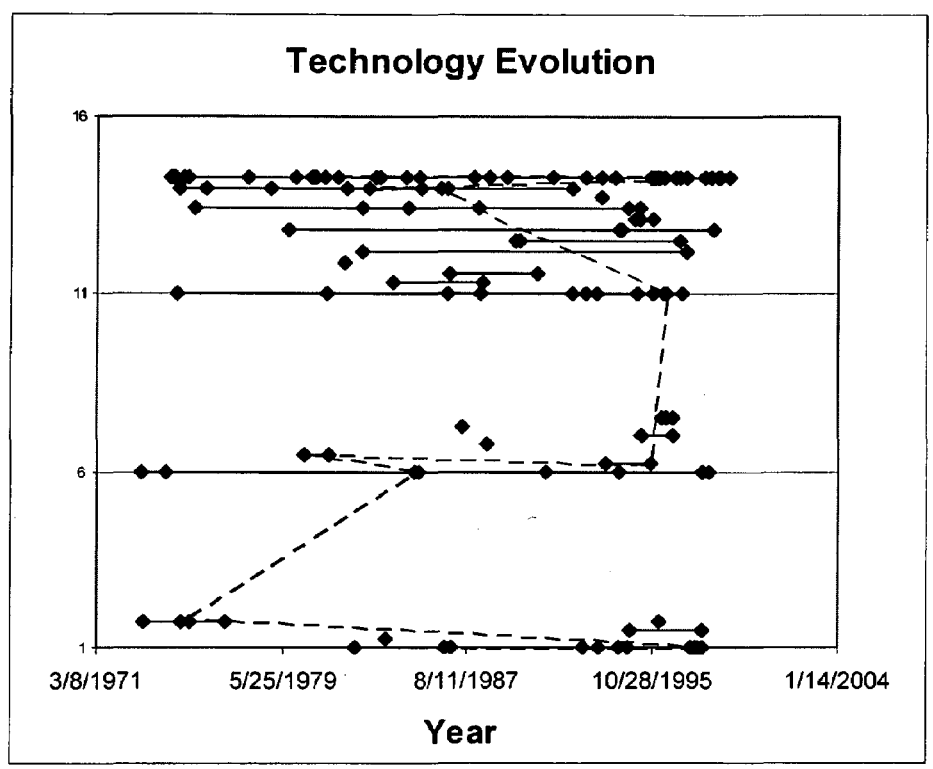
FIG. 5, depicts still another preferred embodiment of the method of the current invention, illustrating a visual index of the agricultural and laundry uses of surfactants. The dotted line indicates all patents that use the words odor and control, a problem common to both laundry detergents and agricultural pesticides. The figure illustrates one means by which documents within a visual index can be specially highlighted.

Step 110 allows one or more types of additional clustering information to be displayed. As needed, the visual index can be highlighted in order to identify patterns of development and connections that are not otherwise apparent. For example, highlights can be added by connecting patents that have common vocabulary with a line, by rendering patents not connected with the theme or topic to be less visible or invisible, by choosing an alternate color, or by using other visualization methods to make themes or topics visually apparent. FIG. 5 is an example of a patent that has been highlighted by this method. If a co-citation analysis has been completed, patents with common journal references, for example, could be highlighted by the methods described.

Step 120. With the above steps, a visual index to the patents has been formed, and can be used in making technology investment or R&D decisions. Decisions are derived by examining the visual index for the following: patterns indicating continued technology development, patterns indicating that technology evolution has slowed or stopped, patterns that indicate emergence of a new technology or other patterns as determined by the user's needs.

If the analysis is conducted with full text patents, the location of a word pair within the patent can be indicated on a third (z-) axis. A word pair that is located in the title, abstract, and claim would suggest a key topic. A word pair located only in the prior art, for example, can indicate a less relevant or older topic or it can indicate a newly emerging topic that is not yet part of the current technical vocabulary.

The analysis need not be limited to using word pairs. Word clusters or other word groups can be used. For example, a two, three or four word group can constitute the analysis starting point, and the words composing word groups need not be adjacent to one another in the document text. Multiple word patterns can be formed from the list developed in Step 060 or can be supplied by the user.

Technology topics can be further defined by identifying common Foreign or U.S. patent references. In this case, co-word analysis can be linked with citation analysis or artificial intelligence, data mining or knowledge discovery analysis methods to provide improved identification of Technology Topics.

While the method of the current invention has been demonstrated with English language U.S. patents, it will be apparent that the method is applicable to any language or a combination of languages.

Those skilled in the art will recognize that documents other than patents can be processed by the method of the current invention. Visual document indexes can be created for each of document type or for combinations of document types. Those skilled in the art will also recognize that other variations of the above procedure are possible, and that the inventive method is not limited thereby.

Co-citation Methods and Patent Analysis

Figure 6:
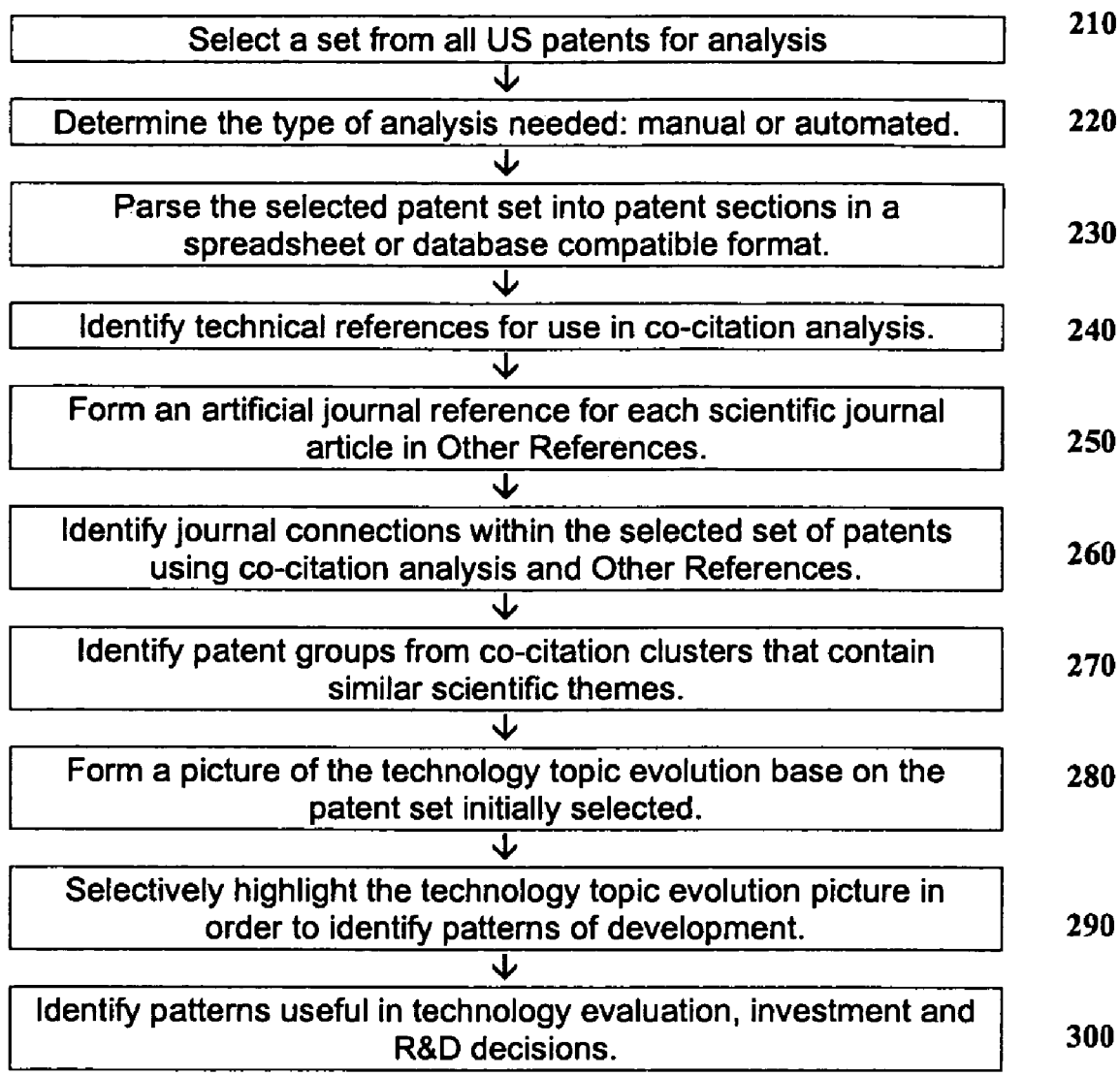
FIG. 6 is a block diagram description of the method of the current invention, and depicts a method to create a visual index using co-citation analysis to create patent groupings.

In FIG. 6, an analysis method that leads to a visual patent index that is based on co-citation analysis is diagrammed. Typically, co-citation analysis relies on references from published scientific journal articles as a means to cluster articles that cover similar research areas. Co-citation analysis can be conducted with references other than scientific or technical journal articles, newspaper articles for example. However co-citation analysis has been most often applied to scientific or technical journal article references from sources where the reference structure is well defined, and is, therefore, compatible with computer processing.

In U.S. patents, the Other References section contains references to scientific and technical journal publications, newspapers, product literature, government reports, and a variety of other literature sources. However, the formats of the scientific and technical references are not always equivalent from patent to patent, and as a result, computer aided co-citation analysis of this information source is difficult, time consuming, and expensive. An object of the present invention is a method of forming artificial journal references that facilitate rapid, cost-effective co-citation clustering of patents, and ultimately leads to a visual patent index based on the artificial journal reference and co-citation analysis.

The preferred embodiments of the method of the invention are now described with reference to FIG. 6. For the sake of clarity, the method will be described using an example analysis that involved analysis of titles and abstracts of U.S. patent documents describing technology futures in surfactants used in laundry detergents or agriculture. The examples herein are not to be considered to be limiting of the invention, but generally illustrate the practice of the invention.

Step 210 is equivalent to Step 010, and involves selecting a document set composed of U.S. patents for further analysis. The set can be selected by searching with keywords, by searching patent classes, by searching assignees or authors, or by a combination of methods. The result of the search is a comprehensive set of patents that substantially encompasses the area. The set can include front-page information or it can include the entire electronic text version of a patent if a more comprehensive analysis is desired. Sources of patents for use in this step include the U.S. Patent and Trademark World Wide Web site, commercial sources, CD ROM compilations, and other means to obtain access to patents.

Step 220 is equivalent to Step 020, and is an especially preferred step in the method of the invention. If the comprehensive set of patents for analysis is less than approximately 20 patents, automated or semi-automated analysis may not be necessary. Reading and manually classifying the results may appropriate, but automated or semi-automated analysis can be performed, if desired. If the comprehensive set of patents for analysis is greater than approximately 20, more preferably greater than approximately 50 patents, automated or semi-automated analysis is appropriate. With many patents to analyze, the possibility of missing a connection becomes larger, and automation of analysis can help to avoid such errors.

Step 230 readies the data for an electronic analysis system. The selected patent set is divided into patent sections, and each section is incorporated into an area on a spreadsheet, for example. The result is that the patent sections reside in a spreadsheet or database compatible format. The result can be held in computer memory or displayed as a spreadsheet. In an especially preferred embodiment, a spreadsheet or database compatible format is formed containing all of the references cited within the Other References sections from the patents in the selected set. Each reference is associated with at least the patent number of the original patent.

Compiling the information in a spreadsheet or database compatible format is a key step in the automation of patent analysis. Step 230 may be an optional step in some programming languages. However, when patent data from the World Wide Web Site of the U.S. Patent and Trademark Office is opened in Microsoft Excel™, for example, the patent title and patent number appear always to be in the same location, and can easily be identified. However, other tables shift from document to document depending on the structure of the document. Step 230 is a preferred embodiment to gain control over the data and assure that appropriate elements are correctly categorized for analysis.

The object of Step 240 is the identification of technical and journal references that will be used in co-citation analysis after appropriate artificial references have been formed. In a preferred embodiment of the invention, only scientific or technical journal articles need to be identified for further processing into artificial journal references. In a still more preferred embodiment of the invention, all references can be categorized into predetermined categories. Categories can include scientific or trade journal articles, conference compendia, books, newspapers, government publications, and other publications such as Material Safety Data Sheets, or product brochures, among others.

Searching the reference for the newspaper's name or a common abbreviation can identify newspapers. MSDS's are usually identified as such in the Other References section. Product brochures are often identified as a brochure or product literature. Conference titles often say "symposium." Books are uniquely referenced to a publisher. With a list of publishers, and the recognition that there are a limited number of publishers of scientific or technical literature across the world, identification of a book in the list of references can be accomplished with great accuracy.

Scientific or technical journal articles can be identified by the journal name contained in the reference. However, journal names cited in the Other References section of U.S. patents can be written out in full or may be abbreviated, sometimes with non-standard abbreviations. Searching the list of references derived from the Other References sections of the selected patent set with a list of journal names and abbreviations permits an accurate identification of scientific or technical journals. Standard search methods can be utilized to effect the identification. In some cases, it can be advantageous to use search wildcards. For example, a search might utilize the search criteria Bio* Bioph* A* where * is a wildcard that represents any combination of letters or numbers or other symbols. Such a method could still correctly identify a journal even if the author had chosen to use a non-standard abbreviation such as Bio. Biphys.A. The use of wildcards in searches can substantially reduce search time as it can reduce the number of patterns that must be checked, but it can introduce errors as well. Appropriately sequencing the search criteria can be useful to avoid introducing errors. The other parts of the artificial reference can be identified similarly.

FIG. 7 illustrates the results of the analysis described in Step 240. A total of 1020 references were extracted from 45 patents chosen from four market areas that use surfactants. The method correctly identified the category and the journal name with acceptable precision. Failures were from references that were incomplete or unrecognizable to an expert.

The object of Step 250 in FIG. 6 is to translate the scientific or technical journal article references into an artificial journal references that have a standard format and which, thereby, enables the application of co-citation analysis methods to form a visual patent index.

The importance of forming an artificial journal reference can be illustrated by considering the following reference formats to the same journal article.

Tandon, S., et al., "The Effects of Lauryl Maltoside on the Reactivation of Several Enzymes after Treatment with Guanidinium Chloride", Biochim. Biophys. Acta., 955:19-25 (1988).

Tandon, S. et al. Bio. Biophy. A., 955:19, 1988.

Each reference is correct, and would permit the article to be found in a library. However, the two references would likely be seen as two different references in a co-citation analysis.

To solve the problem of heterogeneity in the format of references from the Other References section of U.S. patents and to enable the use of co-citation analysis, an artificial reference can be formed by identifying the pieces of the reference, utilizing the structure of the reference, and utilizing a list of expected journal title abbreviations. While not completely standard, patent specifications typically list the last name of the author first. Recognizing the standard abbreviation for a journal can identify the journal name as described in Step 240. The volume, initial page number and year can be identified by their unique structures, and the year can be identified from its position within the reference and from its form. Hence, an artificial reference that is useful for co-citation clustering of patents can be formed. An example is shown below:

Tando, Biochim et Biophysics Acta, 955:19, 1988.

Step 260 is the step in which co-citation clustering occurs, and is familiar to those skilled in the art. In the most preferred embodiment, the artificial journal reference provides complete journal reference data in a now standardized format, enabling the analysis. Co-citation analysis will reveal the structure of the underlying science described in the selected patent set. The structure can be used to cluster patents to form a visual patent index based on patents that employ a common scientific basis.

In one embodiment of the invention, this step can be modified. Once journal articles have been identified in Step 250, it can be advantageous to cluster all patents based only on the journal title. In some cases, it can be advantageous to cluster patents with lists of similar journals that are known to represent similar research areas. In such situations, the co-citation analysis time, labor and cost can be substantially reduced, and should not be construed as outside the scope of the invention.

In Step 270 patents from the selected patent set are associated with the structure revealed by the co-citation analysis. The references are clustered by co-citation analysis to provide a picture of the science within the selected patent set, and in this step, the patents, associated with references, are similarly clustered together to form Technology Topics. This step is similar to Step 090 in the co-word analysis method.

Step 280 is similar to Step 100. In Step 280, a standard picture of patent art evolution in a Technology Topic can be assembled by plotting the patents on an x-y grid with the filing date or issue date along the x-axis with assignees separated along the y-axis. Single patents can be plotted together along an identified section of the y-axis. One or more Technology Topics can be plotted together in the same figure, forming a visual index similar to FIG. 4. It is possible with website-like programming methods to further link each point to additional data or even the entire patent. An example of such a method is also diagrammed in FIG. 4.

Step 290 allows one or more types of additional clustering information to be displayed. As needed, the visual patent index can be highlighted in order to identify patterns of development and connections that are not otherwise apparent. For example, highlights can be added by connecting patents that have common journal references, common assignees or common authors. If a co-word analysis has also been conducted on the selected patent set, patents with common vocabulary can be highlighted as described in Step 110.

Step 300 is similar to Step 120. With the above steps, a visual index to the patents has been formed, and can be used in making technology investment or R&D decisions. Decisions are derived by examining the visual index for the following: patterns indicating continued technology development, patterns indicating that technology evolution has slowed or stopped, patterns that indicate emergence of a new technology or other patterns as determined by the user's needs.

While, the examples included herein are written on the common assumption that scientific and technical journal articles are appropriate for co-citation analysis, it will be appreciated that other references can also be used. In certain situations it would be useful to use newspapers, for example, as the clustering references, and co-citation analysis could be appropriately utilized. A standard reference format can be formed in that situation as well, and an artificial newspaper reference can be constructed by the methods described. Other reference types or combinations of reference types can also be used in the analysis, as it is appropriate.

Those skilled in the art will recognize that the above procedure can be applied in a variety of other situations, and that the inventive method is not limited thereby.

Patent Class Analysis

Figure 8:
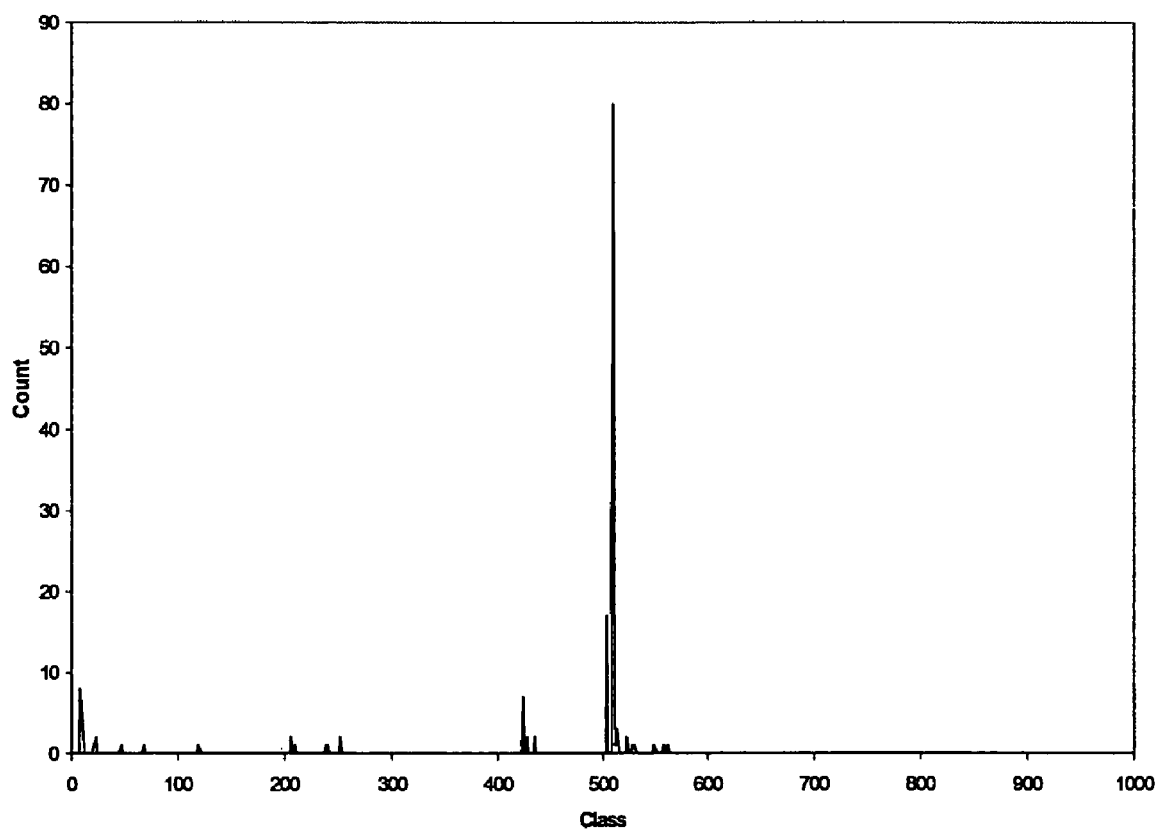
FIG. 8 depicts an example of a patent class analysis.

The data formed in Steps 010-030 and steps 210-230 permit a broad analysis of the patent activity within the selected document set by counting the number of patents belonging to each patent class and/or subclass within the selected patent document set. FIG. 8 is an example of such an analysis. For the selected patent document set, the major patent class is 510, Cleaning Compositions, and the next most frequent patent class is 504, Plant Protecting And Regulating Compositions. The analysis of patent classes can provide a broad picture of the types of areas covered in a selected patent set.

Two Year Analysis

The purpose of the Two Year Analysis is to identify leading, lagging and unchanged activity areas. Such information is valuable in guiding R&D and other investment decisions. For the sake of clarity, the method will be described using an example analysis that involved analysis of titles and abstracts of U.S. patent documents describing technology futures in surfactants used in laundry detergents or agriculture. The examples herein are not to be considered to be limiting of the invention, but generally illustrate the practice of the invention.

Figure 9:
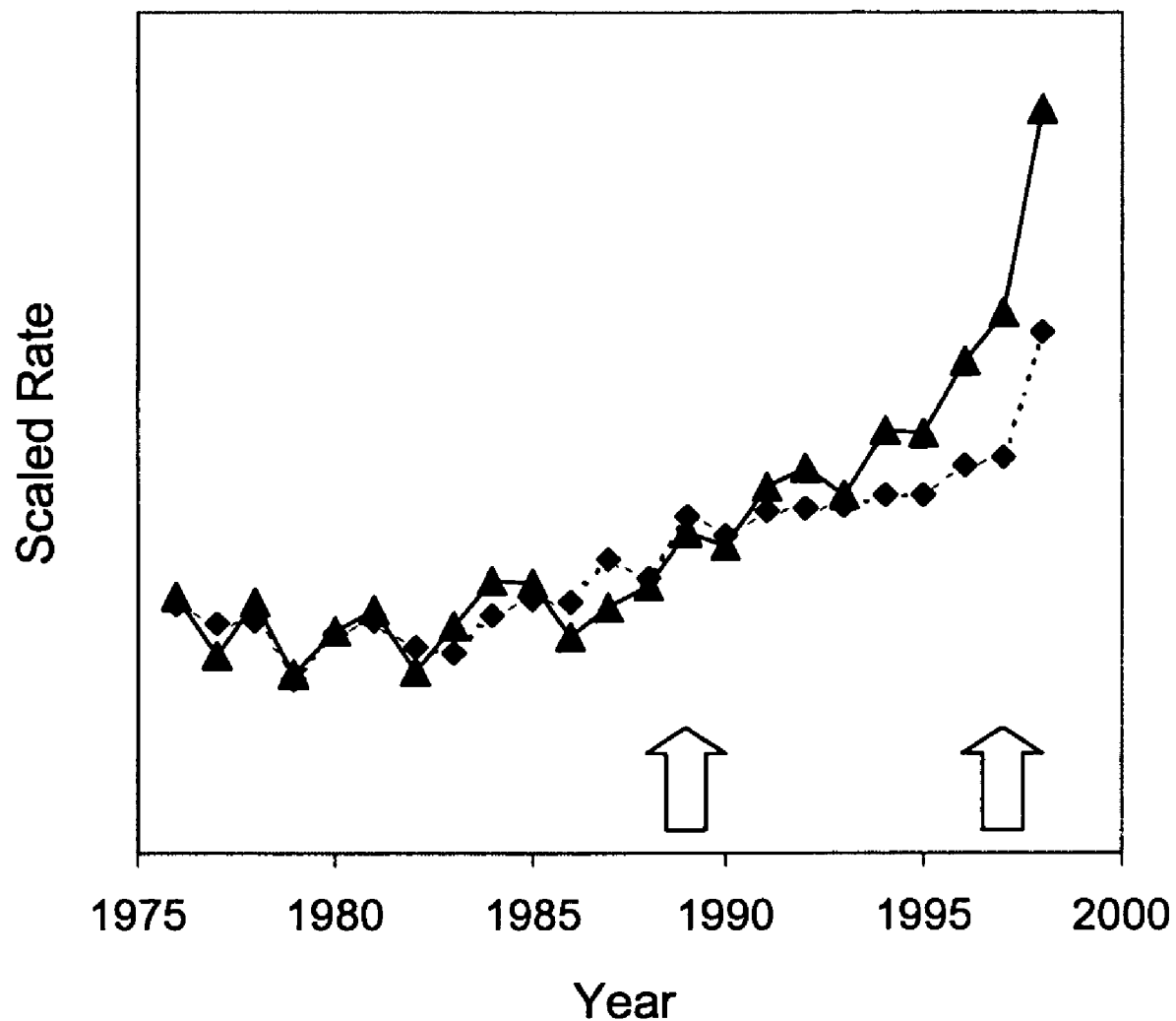
FIG. 9 is an illustration of criteria used to select data for the Two-Year Patent Analysis Method. The open arrows indicate a year where patenting activity in surfactants and detergents was similar to patenting activity for all patents, and another year where patenting activity is greater than expected from patenting activity from all patents.

The patent document set chosen for analysis is composed of patents from two years, and is chosen by searching as described in Step 010 or Step 210. The two years chosen can represent times of change that are known to the analyst from other sources. Otherwise, the two years can be chosen by comparing patent activity in the chosen area to patenting in all areas. FIG. 9 represents such a comparison for surfactants and detergents. It is apparent that patenting activity in 1988 was about the norm for all patents, but had increased above the norm by 1998.

Analysis Categories for the method of this invention can be composed of one Technology Topic, combinations of Technology Topics or other groupings such as market segments and the like. The counts of patents in each Analysis Category for each of the two years used for the analysis are assembled from data from Step 090 or Step 270. A ratio is computed for each Analysis Category.

$$R_i = (N_{i,1}/N_{t,1})/(N_{i,2}/N_{t,2}) \qquad (1)$$

Where $N_{i,1}$ is the number of patents in the selected Analysis Category for the latest analysis, year 1, $N_{i,2}$ is the number of patents in the selected Analysis Category for the earlier analysis, year 2, $N_{t,1}$ is the total number of patents in the set for latest analysis, year 1, $N_{t,2}$ is the total number of patents in the set from the earlier analysis, year2, and i represents the $i^{th}$ Analysis Category and $R_i$ is the ratio for a selected Analysis Category.

For the case in FIG. 9, the first analysis year is 1998 and the second analysis year is 1988. These years are chosen because they represent a change. In 1988, patenting in surfactants was about average, but had increased in 1998. For each Technology Topic, a value of R can be computed. A value of R greater than 1 indicates that patenting in 1998 that is proportionally greater than 1988, and a value of R less than one indicates the reverse. A value of R near 1 indicates the patenting activity is unchanged.

The method according to Equation 1 provides a needed means to determine technology status. It is necessary that the patent set for the analysis be sufficiently broad that the ratio is meaningful, but the formula can be applied with any number of patents as is appropriate for a technology or business decision.

In one embodiment of the invention, the method described can be conducted by manually classifying patents into Technology Topics or categories. However, the cost, time and labor associated with the manual method is substantial, and it will be appreciated that the enabling of a semi-automatic or automatic analysis system is a particularly advantageous feature of the invention.

While the method is illustrated for two patenting years, it is possible to conduct the analysis with more years composing a time series. In another embodiment of the method of the current invention, the ratio can be replaced with a regression slope or other appropriate measure of change. An advantage of using multiple years is that the analysis can made less sensitive to random patent practice fluctuations, but the cost and computing needs to complete the analysis also rise.

Other documents can be advantageously analyzed using the method described for patents. For example, applying the method to counts of published journal articles can identify the emergence of a new area in basic science. Those skilled in the art will recognize that other variations of the above procedure are possible, and that the inventive method is not limited thereby.

Artificial Intelligence, Data Mining and Knowledge Management Methods and Document Analysis Where sufficiently powerful computers are available, the methods from artificial intelligence, data mining, and knowledge discovery can be used to create a visual document index. Artificial intelligence, data mining, and knowledge discovery methods include genetic algorithms, Bayesian learning, neural networks, Markov models, hidden Markov models, partial least squares, and principal component analysis, among others.

Typically, with artificial intelligence methods, a mathematical model must be developed that describes the elements that must be detected. Development of the model uses documents or portions of a document set that form the training set for the model.

Figure 10:
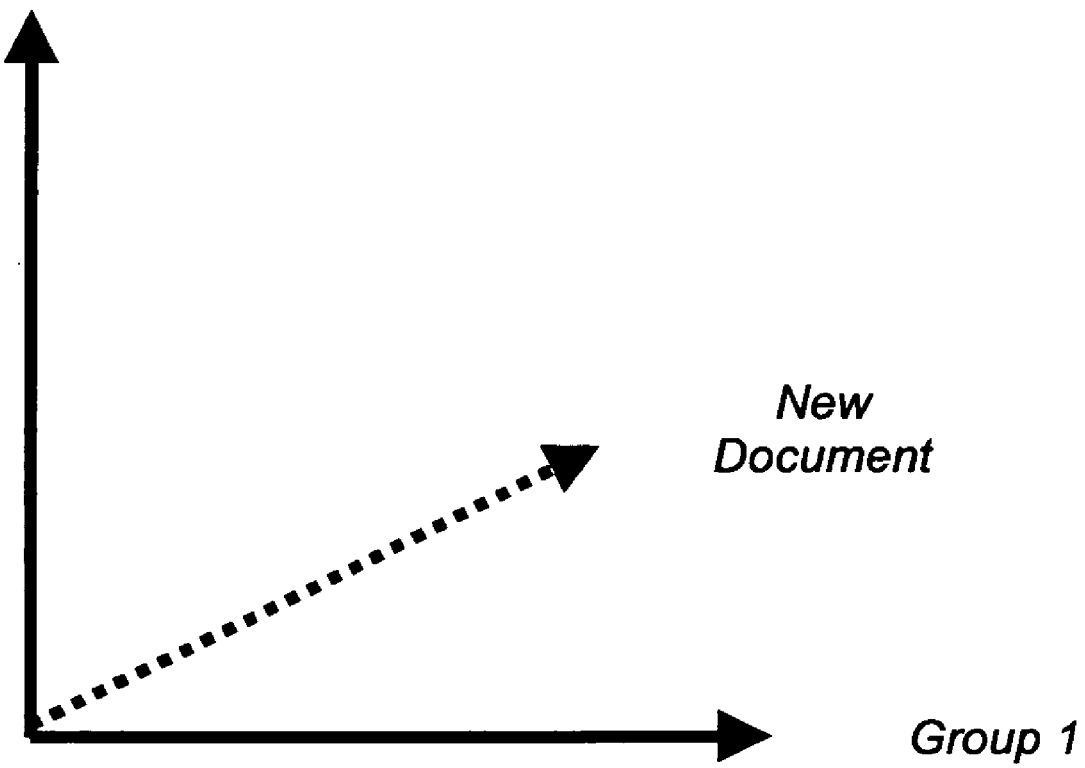
FIG. 10 is an illustration of a two-dimensional vector analysis that allows words from a new document to be classified into Group 1 or Group 2. Group 1 represents a collection of words that describe a technology area. For example, the words found in Group 1 represent the laundry detergent area and include laundry, detergent, granulation, soap, and builders. Group 2 includes the words agriculture, pesticide, odor control, and herbicide, representing agricultural uses of detergents. A new document, represented by the dotted line, could have the following dominant key words: detergent, granulation, soap, builders and odor control. The new document has some relationship to each group, but it has a stronger relationship to Group 1. The position and length of the arrow, a vector in the 2-dimensional vector space of FIG. 10, indicates the group to which the new document most closely ties. The model described can be generalized to a large number of dimensions. In the more general, multi-dimensional case, mathematical manipulation of the data is needed to discover relationships.

Some artificial intelligence methods treat the words in a patent or other document as vectors. An example of a simple vector analysis classification is shown in FIG. 10. The x-axis represents a group of words, for example the words associated with the use of detergents in laundry products. The y-axis represents another group of words, for example, words associated with agricultural uses of detergents. The dotted line in FIG. 10 represents a new word group from a new patent or other document. The position of the dotted line indicates that the majority of the words are most closely related to Group 1. As a result, the patent represented by the dotted line will be plotted in the visual index as part of Group 1. If properly trained, Markov and hidden Markov analysis methods can provide additional insight into the probability that the dotted line in FIG. 10 really does belong to Group 1 by using other information describing expected word associations.

For patent documents, a visual index can be formed using artificial intelligence, data mining and knowledge discovery methods essentially as described in FIG. 2. With these methods, Step 070 is replaced with a chosen artificial intelligence, data mining or knowledge discovery method. Steps 050, 060 and 080 can be optional in with these methods, but may be required in selected implementations of the methods.

Implementation of artificial intelligence methods is computationally intensive, a disadvantage compared to co-word or co-citation methods.

Other documents such as scientific journal literature, trade journal articles, Internet search engine results and the like can be analyzed as described for the patent example.

Other Considerations

The analysis methods described can be implemented in a variety of ways. The methods can be located on a stand-alone computer or PC, can use a local area network (LAN), a wide area network (WAN) or can also use the Internet. Each step described can be located on a separate computer or server, if desired. A combination of stand-alone PC, LAN, WAN or Internet can be utilized as best serves the needs of the business, organization or individual that is implementing the system.

A variety of programming languages can be chosen with which to implement the system described. Languages can typically include Microsoft Visual Basic or Visual Basic for Applications, Java, C, C++, and FORTRAN among other possibilities. The implementation of the invention described is independent of the computer language chosen.

The analysis process or method can be implemented as an automatic or semi-automatic system. Automatic indicates a systems that runs without substantial user intervention starting from the initial patent search statement, and ending with the completion of the patent visual index. Decisions are not subject to user choices or substantial user input except to define the analysis area as in steps 010 or 210. Semi-automatic indicates a system that runs with some user intervention. With a semi-automatic system, a user can choose the specific analysis methods or steps that best suit his or her needs. For example, with a semi-automatic system, a user may be able to specify, for example, whether the analysis is conducted with co-word or co-citation analysis or both, among other choices.

The patent data described represents a time-series. FIG. 5 displays the results of an analysis according to the present invention as documents positioned in defined space with assignees that are arranged in technology related groups along the y-axis and by date along the x-axis. The picture describes the evolution of a technology from a patent perspective. Other information sources can be treated similarly. For example, scientific papers can be similarly and advantageously indexed and displayed. Magazine or other published literature can also be indexed as described. Internet search data can be similarly displayed with, for example, Internet sites in subject groups along the y-axis and a date along the x-axis. In some cases, it can be advantageous for an analysis to display a characteristic of a group other than time on the x-axis. For example, it can be useful in some situations to display the inventor name or inventor institutions on the x-axis. For genetic analysis, it can be useful to display a gene sequence along the x-axis. Accordingly, the method of the present invention is not intended to be limited to analysis of patent data, and the method is not limited to the analysis of time-series data.

It will be apparent to those skilled in the art that a variety of procedures and variations can be used in connection with the present invention, which is limited solely by the following claims.

The invention claimed is:

1. A method for analysis of a collection of documents which comprises the steps of:
    a) selecting a set of documents for analysis;
    b) preparing for electronic analysis of the documents by incorporating selected document sections into a database compatible format;
    c) selecting at least one document section;
    d) forming a list of analysis key words from one or more document sections into an initial word list;
    e) removing duplicate or nonessential words;
    f) standardizing word forms of the initial word list to a common form;
    g) setting a word list threshold;

h) removing word forms from the initial word list that are present with a frequency less than the word list threshold;
i) sorting the resulting word list by frequency;
j) forming a first word correlation matrix using the initial word list;
k) counting the frequency with which a word pair is found in a collection of selected documents;
l) setting a first frequency count threshold;
m) forming a first technology topics collection by selecting word pairs with frequency counts above the first frequency count threshold for each column in the first word correlation matrix;
n) forming an additional word correlation matrix from the words in the collection of the first technology topics;
o) forming an additional technology topics collection by associating word pairs from one or more first technology topics;
p) optionally repeating steps n and o;
q) counting, for each technology topic, the number of words appearing in each document of the document collection and optionally applying a weighting factor;
r) assigning each document in the collection to an additional technology topic; and
s) forming a standard picture of technology evolution by plotting individual documents on a graph with selected technology topics along one axis and a date along another axis;
wherein the collection of documents is chosen from one or more of the group consisting of patents, scientific papers, trade journal articles, newspaper articles, press releases, web pages and magazine articles.

2. A method for analysis of a collection of documents which comprises the steps of:
a) selecting a set of documents for analysis;
b) preparing for electronic analysis of the documents by incorporating selected document sections into a database compatible format;
c) selecting at least one document section;
d) forming a list of analysis key words from one or more document sections into an initial word list;
e) removing duplicate or nonessential words;
f) standardizing word forms of the initial word list to a common form;
g) setting a word list threshold;
h) removing word forms from the initial word list that are present with a frequency less than the word list threshold;
i) sorting the resulting word list by frequency;
j) forming a first word correlation matrix using the initial word list;
k) counting the frequency with which a word pair is found in a collection of selected documents;
l) setting a first frequency count threshold;
m) forming a first technology topics collection by selecting word pairs with frequency counts above the first frequency count threshold for each column in the first word correlation matrix;
n) forming an additional word correlation matrix from the words in the collection of the first technology topics;
o) forming an additional technology topics collection by associating word pairs from one or more first technology topics;
p) optionally repeating steps n and o;
q) counting, for each technology topic, the number of words appearing in each document of the document collection and optionally applying a weighting factor;
r) assigning each document in the collection to an additional technology topic; and
s) forming a standard picture of technology evolution by plotting individual documents on a graph with selected technology topics along one axis and a date along another axis;
wherein the document section is chosen from one or more of the group consisting of document titles, headlines, abstracts, bodies, methods, examples, summaries, results and claims.

3. A method for analysis of a collection of documents which comprises the steps of:
a) selecting a set of documents for analysis;
b) preparing for electronic analysis of the documents by incorporating selected document sections into a database compatible format;
c) selecting at least one document section;
d) forming a list of analysis key words from one or more document sections into an initial word list;
e) removing duplicate or nonessential words;
f) standardizing word forms of the initial word list to a common form;
g) setting a word list threshold;
h) removing word forms from the initial word list that are present with a frequency less than the word list threshold;
i) sorting the resulting word list by frequency
j) forming a first word correlation matrix using the initial word list;
k) counting the frequency with which a word pair is found in a collection of selected documents;
l) setting a first frequency count threshold;
m) forming a first technology topics collection by selecting word pairs with frequency counts above the first frequency count threshold for each column in the first word correlation matrix;
n) forming an additional word correlation matrix from the words in the collection of the first technology topics;
o) forming an additional technology topics collection by associating word pairs from one or more first technology topics;
p) optionally repeating steps n and o;
q) counting, for each technology topic, the number of words appearing in each document of the document collection and optionally applying a weighting factor;
r) assigning each document in the collection to an additional technology topic; and
s) forming a standard picture of technology evolution by plotting individual documents on a graph with selected technology topics along one axis and a date along another axis, thereby creating an x-y plot;
wherein the x-axis of the x-y plot is time-based and the time base of the x-y plot is chosen from the group consisting of publication date, filing date, issue date and priority date.

4. The method according to claim 3, wherein documents within a technology topic are further arrayed in groups chosen from organizations, companies, assignees, individuals and authors.

* * * * *